May 26, 1953     W. W. CRILEY ET AL     2,639,632
FORGING MACHINE

Filed April 19, 1948                           5 Sheets-Sheet 1

INVENTORS
WILLIAM W. CRILEY
FREDERICK F. CRILEY
HENRY P. BOGGIS
BY
Justin W. Macklin
ATTY

INVENTORS
WILLIAM W. CRILEY
FREDERICK F. CRILEY
HENRY P. BOGGIS

May 26, 1953 W. W. CRILEY ET AL 2,639,632
FORGING MACHINE
Filed April 19, 1948 5 Sheets-Sheet 3
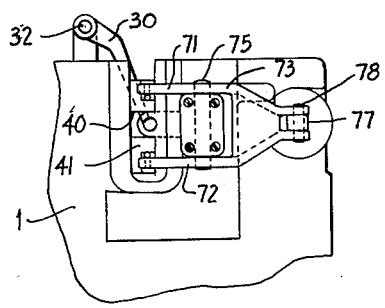
FIG. 5
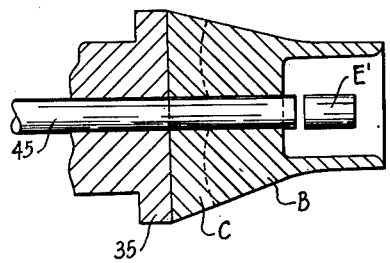
FIG. 11
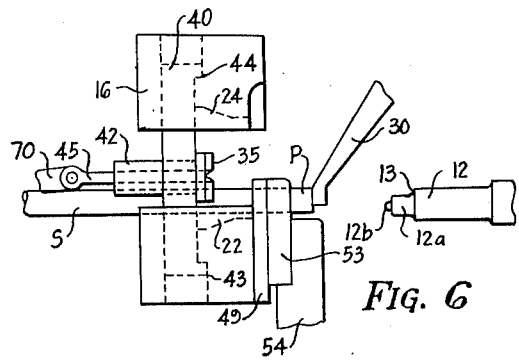
FIG. 6  FIG. 7
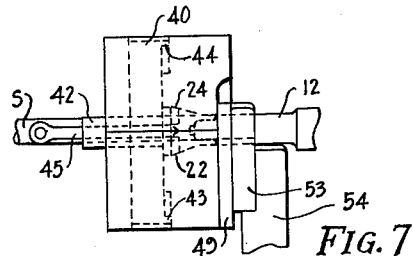
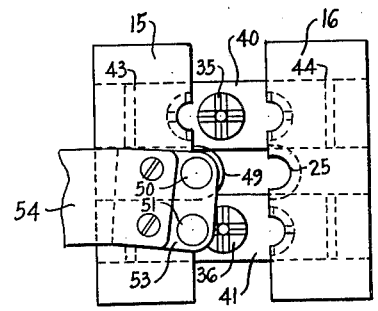
FIG. 8
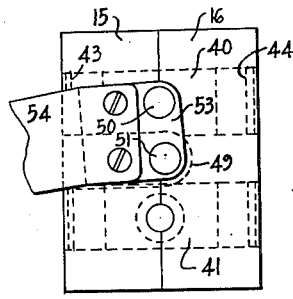
FIG. 9
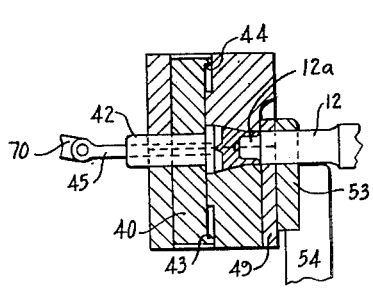
FIG. 10
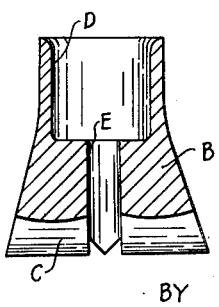
FIG. 12
INVENTORS
WILLIAM W. CRILEY
FREDERICK F. CRILEY
HENRY P. BOGGIS
BY
Justin W. Macklin
ATTY INVENTORS
WILLIAM W. CRILEY
FREDERICK F. CRILEY
HENRY P. BOGGIS
BY
Justin W. Macklin
ATTY INVENTORS
WILLIAM W. CRILEY
FREDERICK F. CRILEY
HENRY P. BOGGIS
BY Justinle Macklin
ATTY Patented May 26, 1953

2,639,632

UNITED STATES PATENT OFFICE 2,639,632

FORGING MACHINE

William W. Criley, Shaker Heights, Ohio, Frederick F. Criley, Terra Ceia, Fla., and Henry P. Boggis, Shaker Heights, Ohio; Wilma Suits Criley, executrix of said William W. Criley, deceased, assignors to said Frederick F. Criley, as trustee Application April 19, 1948, Serial No. 21,796

10 Claims. (Cl. 76—5)

This invention relates to a machine designed primarily for making different kinds of forgings from short lengths of stock sheared from the end of a bar.

The general nature of such a machine is illustrated in our prior patents, No. 1,869,006, granted July 26, 1932, and No. 2,038,165, granted April 21, 1936.

The general object of the invention is to complete a forging with simple equipment and a minimum of labor and forming steps. An example of forgings in the making of which our machine is particularly useful is that of drill bits, such as shown in Patent No. 2,322,420, granted June 22, 1943, to E. Craig. Other examples include gear blanks, crusher balls, socket wrenches, and the like. Detachable rock drill bits having an enlarged head carrying cutting teeth on the face at one end, and having a shank and socket formed therein are illustrative of such pieces or articles which may be formed from bar stock of smaller diameter than the finished piece. The sides of such bits are usually tapered for part of their length and preferably have an axial opening.

The forming operations include cutting off the stock; upsetting and expanding the metal and forming a cutting face or teeth and forming a taper on the exterior; and punching the axial hole from the bottom of the socket through the cutting face.

An object of the present invention is to provide in a single forging machine means for accomplishing all of these operations and delivering the finished piece from the machine—preferably one at every stoke or at least at every other stroke of the main or header slide.

In the forging of some articles affording like problems, we have provided two forging tools on the header slide and two forging die impressions, and have provided means for transferring the work piece alternately to the two die impressions.

As stated, a machine of the general nature of that shown in our prior patent, No. 2,038,165, may be used, and, for some purposes, in connection with the shearing and transferring operations, we may use a floating header such as shown in that patent.

Other objects include so arranging the machine that blanks may be cut off from the heated bar by the die closing movement of a transverse die slide, in which case the following steps may be carried out:

The severed blank is then moved to a position where a forging punch may force it out of the shear blade into the die impression and against an anvil, and expand and shape its exterior while forming a socket therein and shaping teeth on the cutting face. The bar stock, meanwhile, may be fed into cutting off position, and after withdrawal of the forging punch the stock is again severed, and the blank moved to another similar die cavity or impression with its anvil, and there to be similarly acted upon by another (duplicate) forging punch carried by the header slide.

A specific but most important object is to form the axial opening or water hole in a bit during forging and punching the hole through it before releasing it from the dies. To this end we provide that as the header punch is being withdrawn, and while the forged piece is still held in the die, an axial punch is moved from the opposite direction toward the header slide to punch the water hole through the bit.

Another object includes arranging the anvil member or members upon a shuttle plate which may be moved to an intermediate position as the split dies are opened, so that the anvil assures moving the forged piece free from the die impressions. Thus, when the punch is withdrawn and the dies are opened, the forged piece is free to drop.

Various modifications of our method of forging such an enlarged head having socket or shank portion, or pieces of various other shapes, and which utilizes a shear timed with the cross movement of the die slide, may be made without departing from the scope of the present invention.

The general object attained by the invention is to perform in one machine the cutting off, forming, heading, side shaping, socket forming, axial punching, and forcible releasing from the dies and the discharging, with no idle cycles.

Fig. 5 is an elevation on the same scale as Figs. 1 and 2, showing the stock feeding end of the machine, i. e., looking from the left of Fig. 1;

Figure 1:
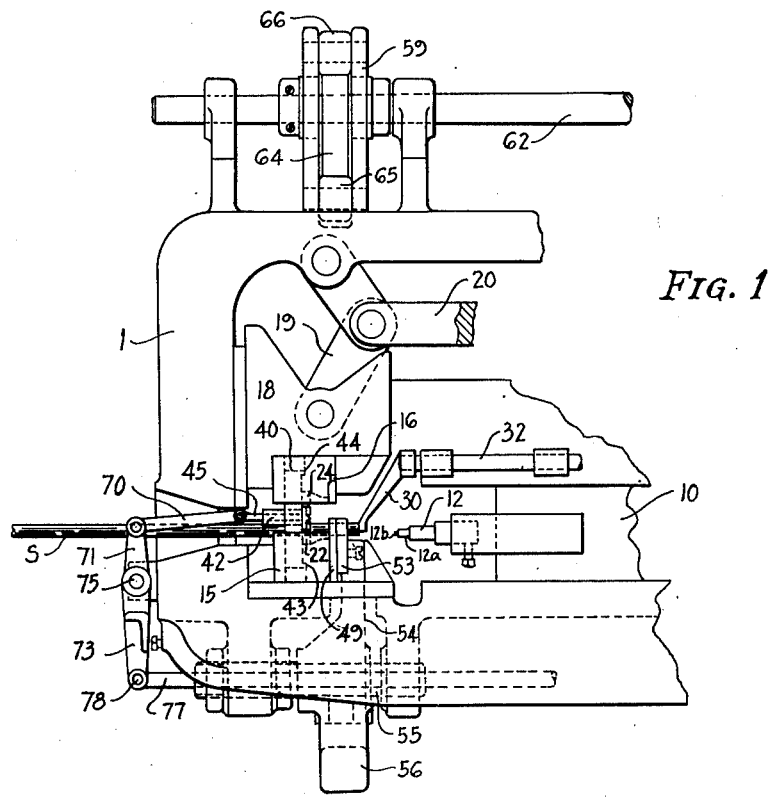
Fig. 1 is a plan view of the die holding end of the frame and associated parts of a forging machine embodying our invention.
Figure 2:
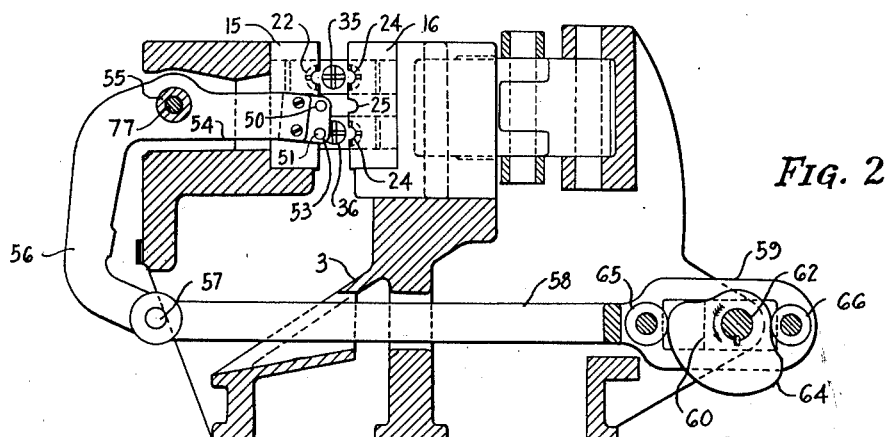
Fig. 2 is a transverse section through the frame of the machine showing the dies, slide, and shear operating mechanisms.
Figure 3:
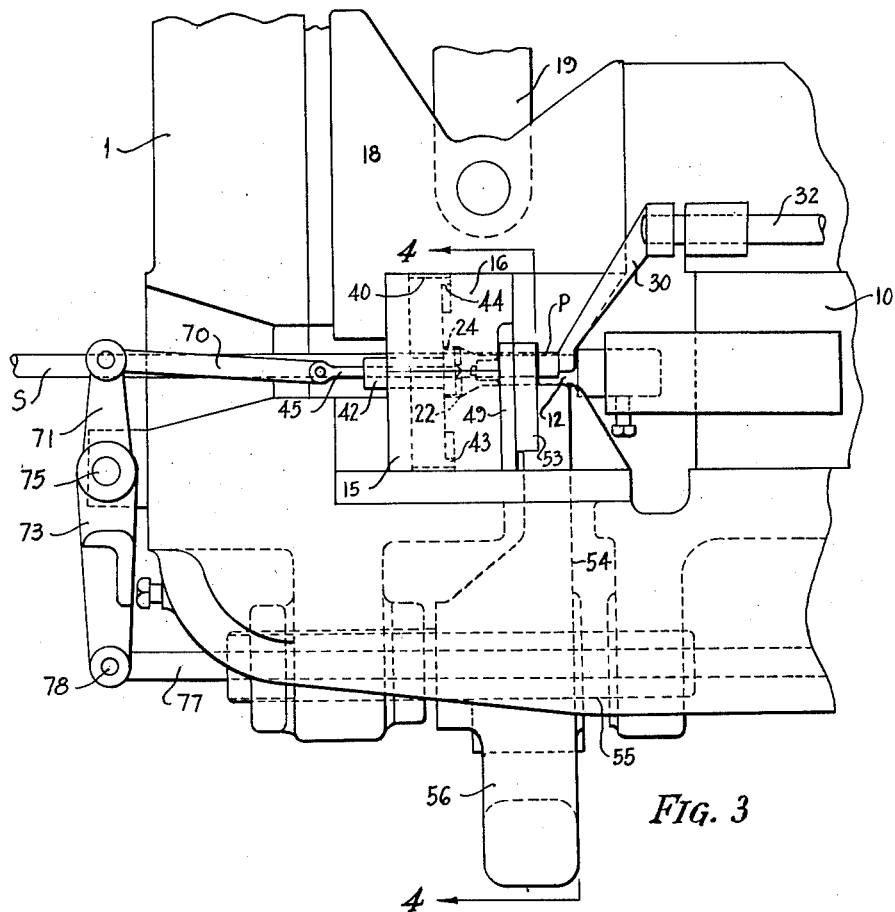
Fig. 3 is a plan view on an enlarged scale showing the parts in die closed position.
Figure 4:
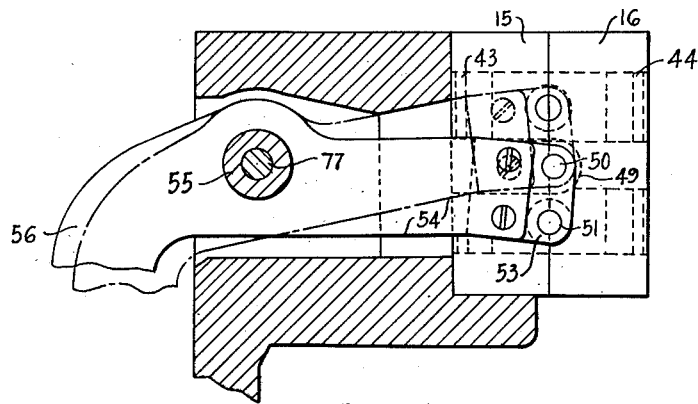
Fig. 4 is a fragmentary section, on a further enlarged scale, taken on a plane indicated by the line 4—4 of Fig. 3, showing the shear position and dies closed.
Figure 13:
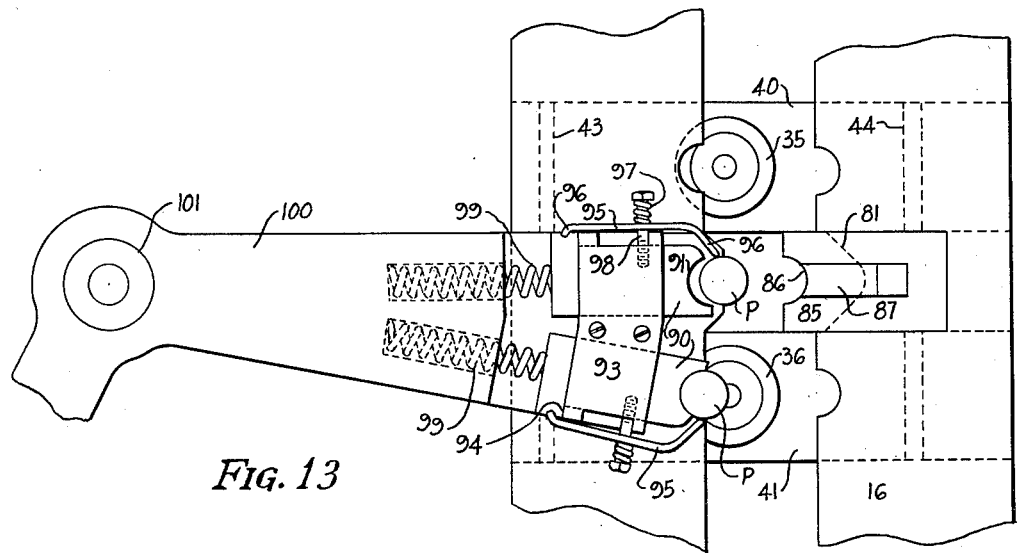
Figure 15:
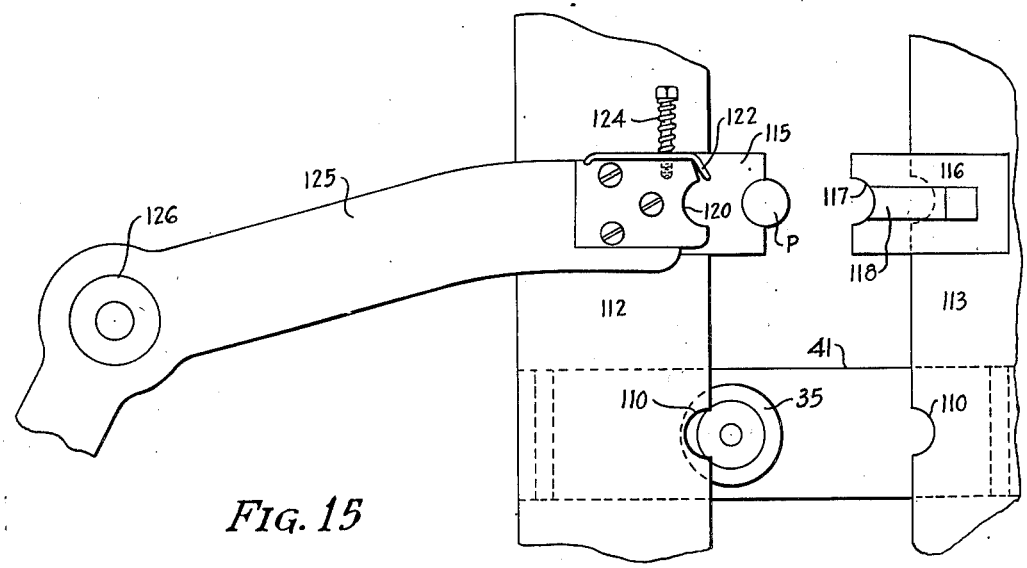
Figure 14:
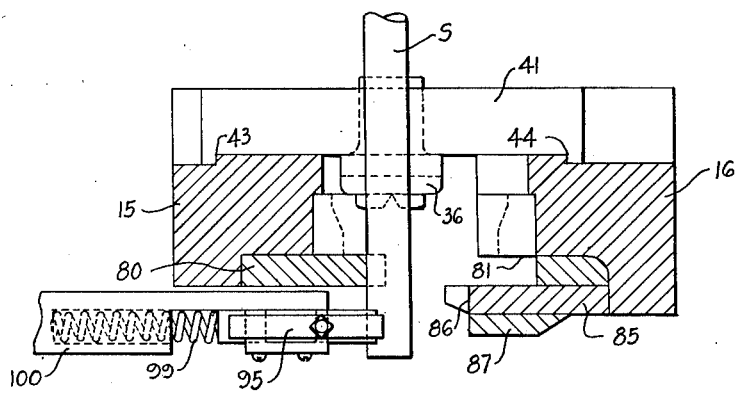
Figure 16:
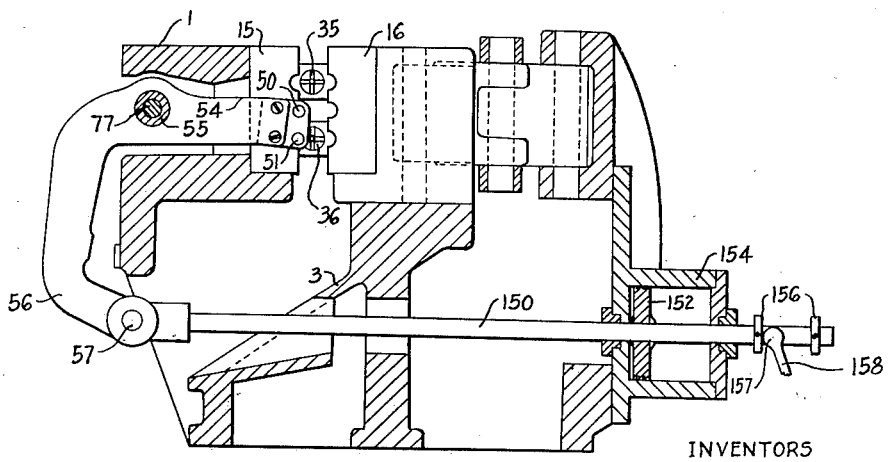

Figs. 6, 7, 8, 9, and 10 are views of die and shear positions taken on the same scale as Fig. 3;

Fig. 11 is a sectional view through the drill bit, showing the punch forming the axial hole;

Fig. 12 is a sectional view of the completed drill bit;

Fig. 13 shows a modified arrangement of the dies with cut off on the movable die and lightweight gripping and transferring device;

Fig. 14 is a horizontal section through the same, showing the die cut off and blank transfer carrier;

Fig. 15 shows a modified arrangement for a single forging cavity with the die cut off arrangement and blank transferring device;

Fig. 16 is a view similar to Fig. 2, showing a modified arrangement for actuating the shear and transfer operating mechanism.

Describing the machine, as shown in Figs. 1 to 10, 1 designates the bed or frame of a forging machine having a reciprocating main or header slide 10 which may carry a forming tool, shown as being in the nature of an extruding piercer 12.

A stationary die member 15 is adapted to coact with a movable die 16 carried on a cross slide or die slide 18, in turn movable in a direction at right angles to the header slide, and shown as connected by a toggle 19 to the side of the bed, and actuated by a reciprocating link 20.

The dies 15 and 16 are provided with two coacting forging cavities or impressions 22 and 24, and with an intermediate stock feed channel, indicated at 25, through which the heated bar stock S may be advanced to a stock guage, indicated at 30. As shown, this guage is carried on an adjustable shaft 32, and arranged to project into the path of the bar stock to limit its inward movement, and thus determine the length of the blank, in the usual manner.

In the form shown, there are two pairs of cavities or die impressions 22 and 24, each of which embraces the projecting head of one of two anvil members, 35 and 36, which, in turn, are mounted on shuttle plates 40 and 41. Hollow shank portions 42 of the anvil members, as indicated at 42, extend through the shuttle plates, and slidable through the shanks 42 are water hole punches 45, actuated by a mechanism to be later described.

Each shuttle plate has shoulders or stops, indicated at 43 and 44, engaging shoulders in the die members and so effecting movement of the anvil shuttle plates, with relation to the movement of the slide 16, as to move the anvils and thus bring the finished pieces to an intermediate position between the open dies, as will later appear.

The heated stock bar has its inner end thrust through the stationary shear plate and through either of two openings 50 and 51 in a shear plate 53 of a vertically swinging shear. This plate 53 is carried on the end of a rocker arm 54 pivoted at 55 to the bed of the machine, and has a rigid downwardly extending arm 56 pivotedly connected at 57 with an operating link 58. This link has a yoke portion 59 shown as slidably embracing a guide block 60 on a cam shaft 62 at the side of the bed frame. When two forging impressions are employed, the cam shaft rotates in a relationship of one rotation to two rotations of the main shaft or two strokes of the header slide.

Rigid on the shaft 62 is a cam 64 cooperating with rollers 65 and 66 carried on the yoke to effect a timed reciprocation of the link actuating the vertically swinging shear for shearing the blank from the end of the bar projecting through the stationary shear blade 49. The sheared blank is then carried either upwardly or downwardly in one of the openings 50 or 51 of the shear plate 53 to positions opposite the forging impressions 22 and 24 above the center, or the corresponding die impressions 27 and 28 below the center.

The punch members 45 projecting through the anvil members 35 and 36 are pivotedly connected through links 70 with the arms 71 and 72 of a rocker yoke 73 pivoted on a vertical pin 75 mounted on the frame 1. A push rod 77 pivoted at 78 to the rocker yoke and shown as extending through the hollow pivot member 55, for the cut off rocker arm, is actuated to oscillate the rocker yoke in timed relationship with the other operations through connections with the main shaft, by mechanism not shown.

While, as indicated, many forms of forging may afford similar problems and use some or all of the features of the present invention, the rock drill bit, such as shown in Fig. 12, is especially illustrative of the advantages attained by the present invention.

This drill bit is shown as a one-piece forging, designated B, having its sides flared towards the cutting face on which are formed teeth C, and as having a socket D which is adapted to embrace and be removably secured to the shank of a drill rod, and which has an axial water opening, indicated at E, passing from the socket through the cutting face.

Heretofore, several forging steps have been required for forming of such a piece. By the present invention we are enabled to complete and deliver a finished piece, such as the drill bit shown, on each reciprocating cycle of the main or header slide, as will appear from the following summary of the operation so far described.

Assuming the bar stock is fed through the central stock feed channel 25 and through the stationary shear blade 49 and into and projecting through the opening 50 in the moving shear blade 53 (and that the dies are now brought to the closed position, shown in Figs. 7 and 9), the turning of the cam 64 is so timed with the die closing movement that the portion of the bar stock, which is to form the piece to be worked, indicated at P, is now sheared by the vertical motion, in this case the upward movement, of the shear plate 53 and its carrying arm 54.

The blank is brought opposite the upper die impressions 22 and 24 where it is held by a rest position of the cam 64. There is now a corresponding dwell of the die closing mechanism, while the header slide advances the forming tool 12, which pushes the piece P through the plate 53 into the recesses 22 and 24, and forces the hot metal of the sheared blank P to expand outwardly and to have its teeth C formed thereon against the anvil head member 35.

A projection or nose on the piercer tool 12, indicated at 12a, forms a portion of the axial water opening E, say, to a depth indicated at E in Fig. 11. As the header slide now recedes, the rocking yoke 73 is actuated by a thrust upon the rod 77, which through the links 70, moves the punch members 45 inwardly. As stated, these punches 45 are slidable through the shanks of the anvil members. One of these punches 45 thus pierces through the head of the formed piece while it is still gripped in the dies and pushes out a small slug E' (Fig. 11) completing the water opening E. The other punch 45 moves idly.

It will be noted that the links 70 follow the lateral movement of the punch members 45 as they are moved with the shuttle plates. This punching action is preferably very quick, occurring in a small portion of the forging cycle. As the dies open, the forged piece is pulled away from each half die impression 22 and 24 by the anvil member forming the face and teeth of the piece, i. e., the drill bit, and by reason of the shoulders 43 and 44 centering the anvil with relation to the open dies, the finished piece is free to drop onto the deflecting surface 3 (Fig. 2), and thus be delivered from the machine.

It will be noted that the opening movement of the die is sufficient that the diameter of the finished piece is slightly less than the distance between the bar stock S and the movable die, so that the upper piece may likewise drop freely.

Before the dies again close, the bar stock is thrust forwardly to project the new end piece P through the shear plate 40 and into the lower opening 51 in the vertically swinging shear plate 53. A reverse movement of the arm 58 now being effected by the cam 64 shears a new blank P from the bar. Further swinging movement of the shear plate carries the blank to the lower die impression, in the die members 15 and 16, where it is pushed through the shear blade 53 and formed against the counterpart anvil 36 by a replica of the punch 12. On this stroke of the main slide, the upper punch merely moves idly into its cavity.

In this forging action, the metal of the blank is caused to flow against the anvil and be expanded into the die impression to form the body of the drill bit, while the socket D is formed by a skirt of the metal forced backwardly over the nose 12a of the piercing tool (Figs. 6 and 10) against the shoulder 13.

A part of the length of the axial water hole may be formed at the bottom of the socket by a small projection, indicated at 12b, which will relieve the work of the punch 45 to some extent. However, this is usually not necessary.

To project the end to be sheared into the vertically movable shear blade, the bar S may be fed inwardly at any time that this shear blade is stationary. It is preferred that the shear blade remain in a stationary position when the header slide is on the back stroke. Movement of the shear blade should be timed to deliver the shear blank in front of the die impression in line with the piercing tool at a time when the dies are closed. It will be seen that after the dwell period, the shear blade moves either up or down, and the die slide starts at about the same time. The piercing tool will thus engage the blank when the dies are closed and the shear blade is again stationary.

The use of two die impressions and two forging tools permits forging a piece, first in one die impression and then in the other. Thus, while a piece is being forged in one die impression, the other tool and die impression are idle, and thus have a cooling interval. This contributes greatly to continuous operation of the machine with resulting increased production.

Thus, it will be seen that we have accomplished an essential important saving by the present invention, and we are able to forge in either of two impressions in the dies, on each and every stroke of the machine.

The modification shown in Figs. 13 and 14 constitutes an arrangement, the operation of which is similar to that of the structure heretofore described, but in which the shearing of the stock is accomplished by the movement of the die slide, and whereby the transfer device for receiving the sheared blank and presenting it to the cavity may be of much lighter construction. As shown, the operation may be through mechanism similar to that illustrated particularly in Fig. 2, but, obviously, its parts may be much lighter in weight, inasmuch as its function is merely to receive and move the sheared blank.

In such an arrangement, the die impressions and anvil carrying shuttle plates are constructed, as before, except that shear plates are mounted on the die members.

Intermediate the position of the die impressions, a shear plate 80 is fixed in the die member 15, while the die member 16 is provided with a cavity 81 for receiving the projecting end of this shear plate when the dies are brought together.

The forward end of the shear plate 80 is provided with a half-round recess adapted to engage and cut the bar stock S. The coacting shear plate 85 is provided with a half-round cutting recess 86 which is adapted to move past the corresponding cutting edge in the plate 80, sufficiently to completely sever the projecting end of the bar stock when the die slide moves the die member 16 to the die closing position.

A shoulder piece 87 has a forward face for engaging the side of the bar blank being severed, and which prevents tilting of the sheared blank while it is being pushed into a gripper which receives and carries it to the appropriate die impression position.

Such a gripper is shown as comprising a slidable plate 90 having a notch 91 for receiving the severed workpiece or blank P. A spring clamp or latch holds the piece in this notch. Such a clamp may comprise a bar member 95 having one end 96 turned to engage and pivot in a notch at the rear of the slide plate 90, and having a downwardly extending finger 96 adapted to engage and hold the blank under the action of a spring 97, shown as riding on the shank of a retaining screw 98.

As the blank is severed, it is pushed toward the slide 90 causing it to recede against the action of the spring 99. This spring returns the plate 90 to the position shown in Fig. 13, as the die slide moves the die 16 to the open position.

The slide members 98 are held in position by a plate 93 shaped to form slideways for the members 90, and shoulders, as at 94, limit the outward movement of these plates under the action of the springs 99.

In Fig. 13 the lower blank P is shown as held in the lower of the two grippers under the action of another clamping member 95, and the carrying arm 100 on which these gripper slide plates 90 are mounted has been swung, as by a cam or other action, to present the blank to the lower die position.

The arm 100 is indicated as pivoted at 101 which corresponds to the pivot 55 for the vertical shearing and transfer arm 54, and the arm 100 is reciprocated similarly to the arm 54, as described.

It will be seen that as the dies are again closed, a fresh blank will be sheared from the end of the bar, and the header slide with the forging punch may move the blank P from the lower transfer gripper into the lower die impression to forge the same.

Another blank having been severed by the die closing movement will be held by the upper transfer gripper, and as the die opens, the arm 100 swings upwardly carrying this blank to the upper die impression where the upper forging punch will force it into and forge it in the upper die impression.

Another modified form of the invention, shown particularly in Fig. 15, provides for forging on alternate strokes and cutting off the blank from the bar stock on intermediate strokes by the action of the die slide moving the die to closed position.

In this case there is a single forging impression 110 in the die members 112 and 113. The anvil 35 and a single shuttle plate 41 are constructed as before.

Shear plates 115 and 116 are mounted on the die members 112 and 113 with provision for the projecting outer end of the plate 115 to extend beneath the plate 116 into a suitable recess, not shown.

The blank P when severed is moved by the cutting surface 117 and the projecting shoulder 118 into a recess 120 of a plate 121 fixed on the transfer arm 125. Here the blank is caught by a spring-pressed finger 122 which yields upwardly against the action of the spring indicated at 124.

As indicated, this gripping device is carried on the arm 125 which swings similarly to the arm 100 of Fig. 13 about a pivot 126, so located as to be equidistant from the cut off and forging positions, so that as the arm swings downwardly, the blank carried in the transfer gripper will be brought into registration with the die impression opening 110.

With the arrangement just described, a single forging punch, such as the punch 12, may cut off and forge a piece in the die impression on every other stroke of the header and die slides.

In connection with Fig. 2, the means actuating the vertical shearing and transfer mechanism was described as a cam. However, various methods of applying power to the vertical shear arm 54, in timed relationship to the forging cycle, may be used. For example, in Fig. 16 we have shown the arms 54 and 56 as connected through the pivot 57 with a rod 150 actuated by a piston 152 in an air cylinder indicated at 154. Air is admitted into the piston by the operator through suitable valve, not shown, which starts the shearing operation. Any suitable means, such as collars 156 on this rod, engaging a yoke 157 on an oscillating arm 158, may, through mechanism not shown, control the starting and stopping of the machine proper and the forging cycle.

It will be seen that the structures described are simple and effective arrangements for accomplishing the objects outlined in this specification, and that other objects are attained contributing to the effectiveness of the improvements embodied in this invention.

As indicated, various modifications may be made without departing from the spirit and intent of the invention as set forth in the appended claims.

Having thus described our invention, what we claim is:

1. A forging machine having a pair of divided dies forming a die impression, a die slide and actuating means to open and close the dies, a header slide and forging tool thereon adapted to enter the die impression and forge a blank therein, a bridging element across the members of the divided die and adapted to close the bottom of the die impression, said bridging element having an opening, a punch slidable through the opening, and means for operating the punch to penetrate the forging.

2. In a forging machine in combination with the die structure having separable dies forming a die impression when closed, a header slide and forging tool carried thereby for forging a blank in said impression and shaped to form a socket in the forging, an anvil for closing the bottom of the die impression, a shuttle bridging member carrying the anvil and having a slidable relation with both dies, means for moving the bridging member when the dies are opened, an opening through the shuttle member, a punch projecting through said opening, and means for moving the punch into the space of the die impression in timed relation to the forging tool to punch a longitudinal opening through the forging into the socket as the forging tool recedes.

3. The combination described in claim 2 including actuating linkage connected with the punch through the shuttle member and permitting the punch to move with the shuttle plate on opening of the dies.

4. In a forging machine, the combination of a pair of divided dies having a forging impression, means for opening and closing the dies, a header slide and forging tool thereon adapted to enter one end of the impression to forge a blank in the dies and form a socket in the forging, an anvil member closing the other end of the die impression, a bridging member carrying the anvil and having die engaging shoulders effecting relative movement with relation to the dies when the dies are opened, said anvil having an opening therethrough, a punch slidable in said opening, a mechanism for actuating the punch to penetrate the forging to said socket, and means operating said penetrating punch while the dies are closed, said means being so connected with the punch as to permit following the movement of the shuttle bridging anvil carrier.

5. In a forging machine, the combination of a pair of divided dies forming a die impression, a die slide and actuating means to open and close the dies, a header slide and forging tool thereon adapted to enter the die impression and forge a blank therein, a shuttle bridging member movable with relation to both parts of the die and having an anvil surface for closing one end of the die impression when the dies are closed, and means for moving the anvil away from both parts of the die impression when the dies are opened, means for severing a blank from bar stock when the dies are closed, and means for transferring the blank from the severing position to the die impression and ahead of the entering movement of the forging tool.

6. In a forging machine, the combination of a die comprising two relatively movable parts and forming two separated die impressions, an anvil for closing the bottom of each die impression, a shuttle bridging member for and rigidly carrying each anvil, and each bridging member being slidable with relation to both dies, means for moving the bridging members when the dies are open, a shearing element between the die impressions, a coacting shearing element having two shearing and blank carrying means, one of the latter means serving to receive and shear the blank for one die impression and the other for the other die impression, and means for actuating the shearing element on each cycle of the header slide to sever and carry sheared blanks alternately to the forging die impressions.

7. The structure defined in claim 6 in which the forging punches are shaped to cause the metal to flow against the anvil and expand the metal in the die and to form a socket in the punch-receiving end of the forging.

8. The structure defined in claim 7 in which the forging punches are shaped to form a socket in the punch-receiving end of the forging, and in which each anvil is provided with an axial opening, a punch member extending therethrough and linkage for axially operating the latter punch member, and means operating the linkage to punch an axial opening in the blank by movement toward the socket, and means operating the linkage in timed relation to effect the movement before the die parts are separated.

9. The structure defined in claim 7 in which each anvil and shuttle bridging member is provided with an axial opening, a punch slidable therein and operating linkage therefor, said linkage permitting the latter punch to follow the movement of the shuttle.

10. In a forging machine for making drill bits, having a head, a shank with a socket therein and an axial water hole from the head to the socket, the machine comprising the combination of a die having two die impressions, a header slide and two forging punches on the header slide each coacting with one of the die impressions, a shearing means for severing a blank from the end of a heated bar located between the die impressions, means for actuating the shear on each cycle of the header slide, first, in one direction toward one die impression, and, next, toward the other die impression, the forging punches being shaped to form the socket extending part way through the drill bit, the die having an anvil forming teeth on the drill bit, and the anvil having an axial opening, a water hole punch slidable therethrough and means for actuating the punch and connecting operating mechanism for timing the latter punch with relation to the receding motion of the forging punches, and whereby a complete drill bit is forged on each actuation of the header slide.

WILLIAM W. CRILEY.
FREDERICK F. CRILEY.
HENRY P. BOGGIS.

References Cited in the file of this patent

UNITED STATES PATENTS

| Number | Name | Date |
|---|---|---|
| 1,766,484 | Clouse | June 24, 1930 |
| 1,875,586 | Friedman | Sept. 6, 1932 |
| 1,914,514 | Lapham | June 20, 1933 |
| 2,042,375 | Abel | May 26, 1936 |
| 2,094,850 | Schroenrock | Oct. 5, 1937 |
| 2,114,420 | Fretter | Apr. 19, 1938 |
| 2,132,853 | Kearney | Oct. 11, 1938 |
| 2,376,654 | Braendel et al. | May 22, 1945 |